(No Model.) 3 Sheets—Sheet 3.
J. J. HOGAN.
CONE AND SCREW PIPE COUPLING.
No. 415,387. Patented Nov. 19, 1889.
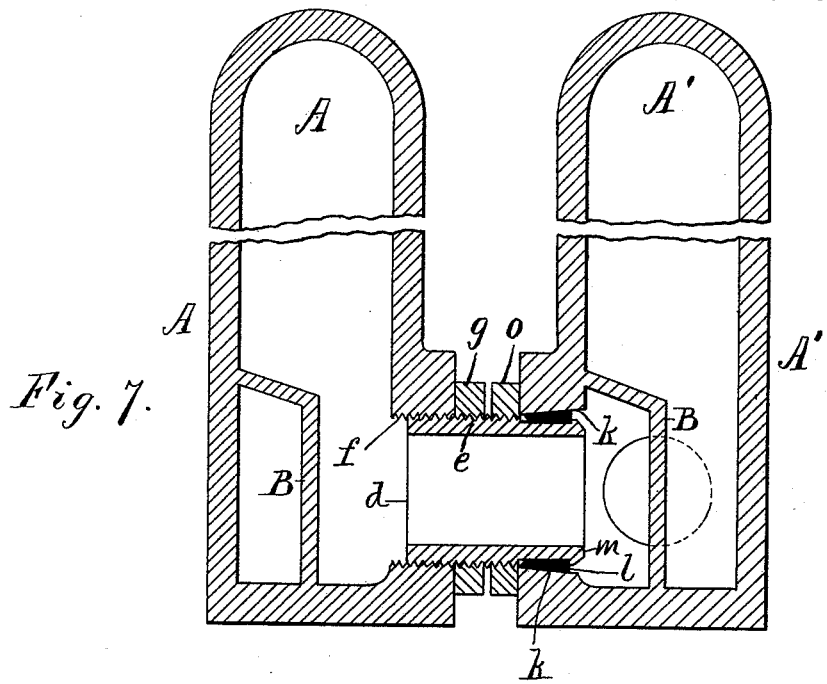
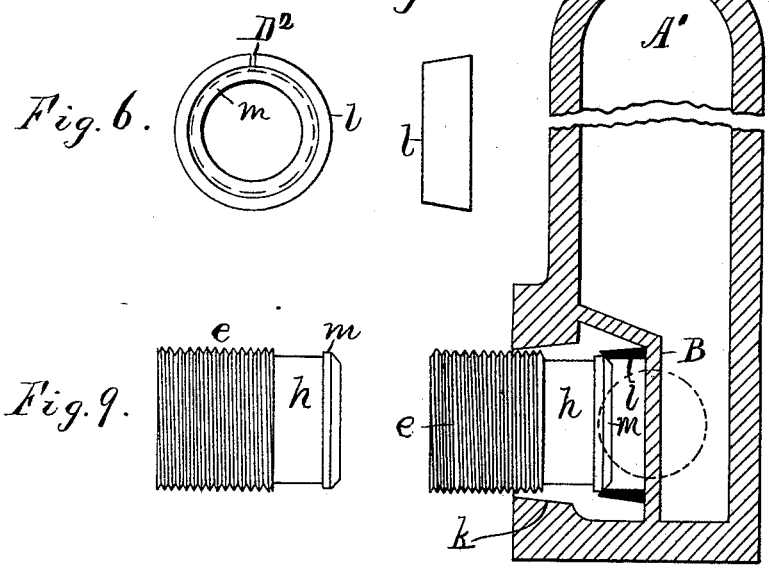
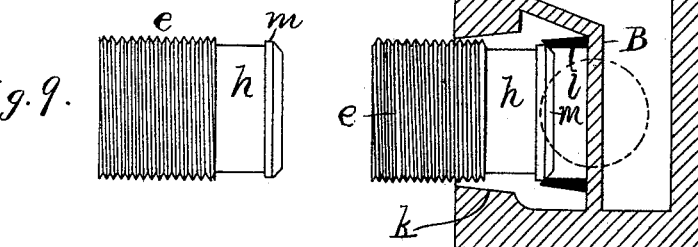
Attest:
L. Lee.
F. C. Fischer.
Inventor.
J. J. Hogan, per
Crane & Miller, Attys.

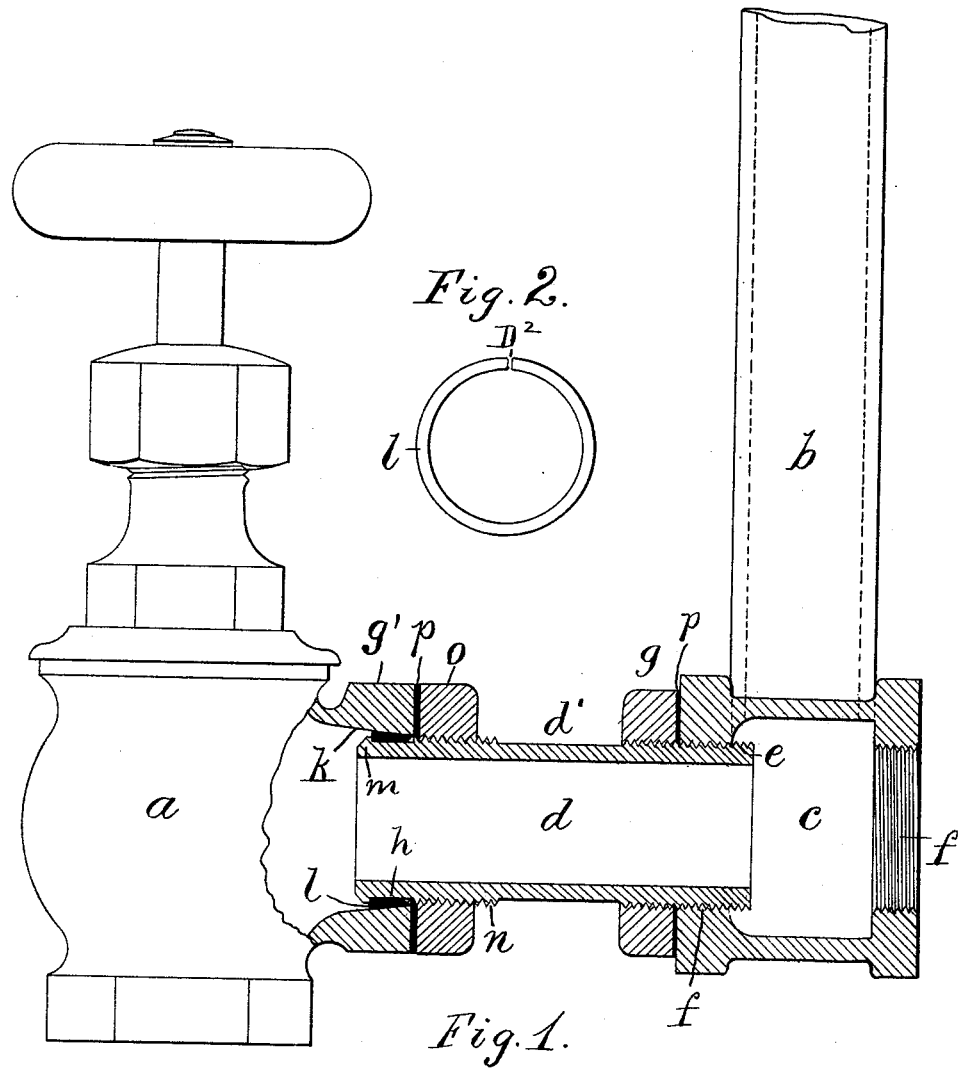

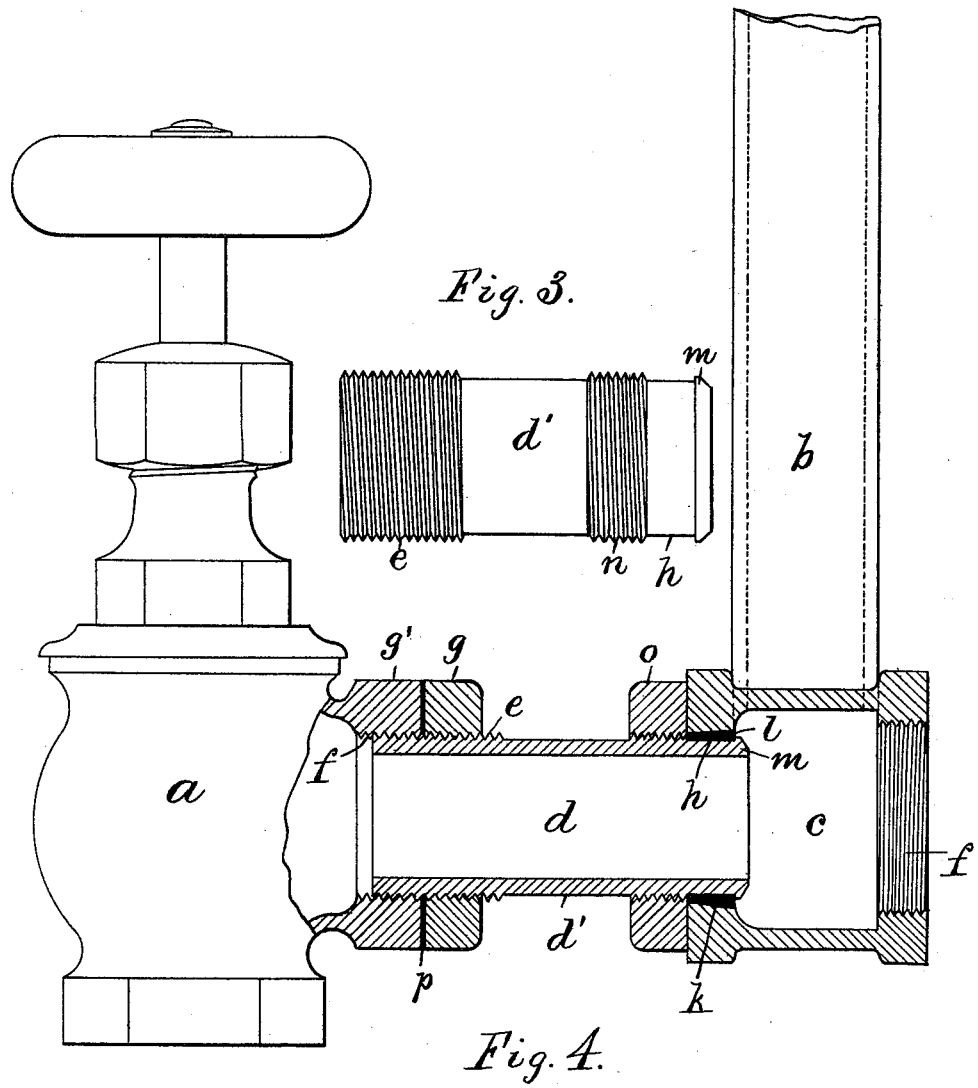

UNITED STATES PATENT OFFICE.

JOHN J. HOGAN, OF NEW YORK, N. Y., ASSIGNOR TO THE HOGAN ENGINEERING COMPANY, OF SAME PLACE.

CONE AND SCREW PIPE-COUPLING.

SPECIFICATION forming part of Letters Patent No. 415,387, dated November 19, 1889.

Application filed December 13, 1888. Serial No. 293,484. (No model.)

*To all whom it may concern:*

Be it known that I, JOHN J. HOGAN, a citizen of the United States, residing in the city, county, and State of New York, have invented certain new and useful Improvements in Cone and Screw Pipe-Couplings, fully described and represented in the following specification and the accompanying drawings, forming a part of the same.

This invention is an improvement upon that set forth in my application, Serial No. 270,235, filed March 26, 1888; and it consists in a tubular connection adapted for uniting by a water or steam tight passage the different fittings in steam and water apparatus. The construction is a substitute for the threaded nipples commonly employed for such connections, and consists, primarily, in a sleeve having at one end a divided conical collar fitted in a groove upon the sleeve and having a threaded portion with one or more lock-nuts applied thereto to draw such conical collar to a seat within one of the fittings. The collar is removable from the groove at pleasure, and the sleeve is thus adapted to have the grooved end inserted in a fitting through a tapering seat smaller than the collar and the collar subsequently applied to the groove within the fitting to hold the end of the sleeve within the fitting by the contact of the collar with the tapering seat. By the use of a single lock-nut applied to the face of the fitting upon the threaded portion of the sleeve the conical collar may be jammed tightly in the tapering seat in the fitting and the sleeve thus rigidly connected thereto. The outer end of the sleeve is then adapted to receive any other steam or water connection. The division in the collar, which permits its removal from the groove, prevents it from forming a close joint with the tapering seat, and a tight joint is therefore made by inserting a suitable packing between the lock-nut and the face of the fitting. The opposite end of the sleeve is formed with a thread to attach it to any other desired fitting, and a jam-nut may also be applied to such portion of the thread to form a tight joint with such fitting, although the holding of the conical collar in the tapering seat is fully effected by the use of a single lock-nut.

The invention also consists in a sleeve provided with sufficient thread to apply lock-nuts between the fittings, so that an external wrench may be used to turn the sleeve when an internal wrench cannot be applied. The construction thus serves either to form a connection between the different sections of a heating-radiator or steam-boiler or between heating-radiators and the cocks and pipes that may be used to connect them with the supply of heating-fluid.

Direct heating-radiators are generally exposed to view in various apartments, where the supply-pipes are brought through the floor and provided with an angle-valve to regulate the supply of heating-fluid, and it is very desirable that a neat connection should be formed between such valve and the radiator because of its exposed position. To effect such connection neatly it is common to use a ground union-joint; but such joints afford no opportunity for adjustment in case the radiator is not set at the proper distance from the valve, and in such cases it is often necessary to use a right and left nipple-connection to afford a certain degree of adjustment or to extend where the ground union will not reach.

My invention is as readily applied to the valve and radiator as a ground union-joint, as it forms a swivel-connection between the valve and radiator, while it affords a means of adjusting the valve to and from the radiator and thus compensating for any error in the location of the latter in relation to the valve.

The invention will be understood by reference to the annexed drawings, in which—

Figure 1 is a diagram, partly in section, of an elbow-valve and a radiator-loop connected by my coupling, the parts being shown in section at the center line where hatched, and the conical seat being shown in the nozzle of the valve. Fig. 2 is an end view of the collar detached from the sleeve. Fig. 3 is a side view of the sleeve alone, and Fig. 4 is a view similar to Fig. 1, with the conical seat formed in the radiator-loop. Fig. 5 is an edge view of the collar detached from the sleeve, and Fig. 6 is an end view of the sleeve and collar combined. Fig. 7 is a vertical section through two indirect radiators at the center of a coupling-sleeve provided with jam-nuts. Fig. 8 is a similar sectional view of one of the radiators, showing the application of the collar to the sleeve within the radiator; and Fig. 9 is an external view of the sleeve with the collar removed.

In Figs. 1 to 4, $a$ is the angle-valve; $b$, the radiator-loop, provided with chamber $c$ at the bottom. $d$ is the sleeve, with unthreaded portion $d'$ at its middle and a threaded portion $e$ at one end to fit the tapped hole $f$ and lock-nut $g$. $h$ is a groove formed upon the opposite end of the sleeve, and $l$ a divided collar fitted in such groove and held therein by a bead $m$ upon the end of the sleeve. $n$ is a thread formed upon the sleeve adjacent to the groove, and $o$ a lock-nut applied thereto.

In Fig. 1 the radiator is shown with two tapped holes $f$ at opposite sides of the chamber $c$ and the thread $e$ upon the sleeve fitted to one of such holes. In the same figure the nozzle $g'$ upon the valve is shown formed with a conical seat $k$, flared internally and fitted to the exterior of the collar $l$, and the nut $o$ clamped upon a packing $p$, placed against the face of the nozzle. The pressure of the nut upon the face of the nozzle serves to draw the collar firmly into the conical seat, and thus connects the sleeve firmly with the nozzle, adapting it to receive a connection with the radiator or with any other desired fitting.

As shown in Fig. 2, the collar $l$ is divided at $D^2$, and would in practice be preferably formed of yielding metal, as lead or copper, so that its ends may be overlapped to crowd it within the seat $k$ before applying it to the groove $h$ in the sleeve. When thus applied within the seat, it would be sprung over the bead $m$ into the groove $h$, and the threaded portion $e$ at the opposite end of the sleeve could then be inserted in the threaded hole $f$ and screwed therein by grasping the middle $d'$ with suitable tongs until the collar came to a bearing within the conical seat $k$. The nut $o$ could then be screwed upon the thread $n$ to jam the collar within such seat to form a tight joint, and the nut $g$ would then be screwed in like manner against the opposed fitting for a similar purpose.

In Fig. 4 the sleeve is reversed, the nozzle $g'$ being formed with the tapped hole $f$, and one aperture of the radiator formed with the conical seat $k$, with the nut $o$, screwed against the adjacent face. The operation of the nut, as in Fig. 1, is to clamp the sleeve firmly to the radiator, with its projecting threaded end adapted to receive the valve $a$ or any other fitting. The single lock-nut is thus plainly sufficient to secure the sleeve by means of the collar in the conical seat, and the opposite end of the sleeve may then be used to form a connection in any convenient manner.

The thread $e$ upon the sleeve is shown in Fig. 1 projected somewhat within the chamber $c$, while in Fig. 4 it is shown projected only partly within the thread $f$ upon the nozzle $g'$, showing its adjustable character.

In Fig. 7, A A' are two radiators provided, as is commonly the case with indirect radiators, with internal partitions B, adjacent to the aperture in which the coupling is inserted. The coupling-sleeve is formed at its middle and at one end with thread $e$, and jam-nuts $o$ and $g$ are fitted to the middle portion of the thread. The radiator A is formed with the threaded aperture $f$, and the radiator A' with the conical seat $k$, adapted to fit the exterior of the collar $l$. The collar would in practice be introduced through the seat $k$ within the radiator and pushed against the partition B. When thus introduced, the grooved end of the sleeve is pushed into the same aperture, as shown in Fig. 8, and forced through the collar. The tapering form of the bead $m$ and the beveled edge of the collar facilitate such operation, and the collar is thus worked into the groove $h$, so that when the sleeve is pulled outward the collar may be jammed within the tapering seat $k$. Until it is jammed tightly therein the sleeve is able to rotate freely within the collar, the nuts $o$ and $g$ being jammed together upon the middle of the sleeve to form a wrench-hold, and the sleeve being thus screwed tightly into the tapped hole $f$ in the radiator A. The nut $o$ is then screwed against the face of the radiator A' and jams the collar tightly within the seat $k$. The nuts $o$ and $g$ being screwed tightly against the faces of the respective radiators, with interposed packing wound upon the sleeve, if desired, complete the joint and hold the sleeve rigidly in place.

Heretofore, in joining radiators together when in their normal position, right and left hand threads have been required, and when right-hand threads only have been used it has been necessary to twist one radiator around upon the other until the threads were jammed tightly together.

The sleeve and collar $l$ may be inserted within the conical seat $k$ before the radiator is erected for use and remain therein until the radiators are placed in their normal position, when the sleeve affords a swivel-joint by which the two radiators may be quickly coupled together without moving them, except the very small distance that the sleeve screws into the thread $f$.

Internal couplings such as that shown in Fig. 7 are sometimes rotated by an internal key applied to a square or polygonal hole in the same; but my invention furnishes a means of rotating the sleeve, screwing it to its seats, and packing the joints where an internal wrench cannot be applied. In such case the jam or lock nuts are used to turn the sleeve by locking two of them together upon the middle of the sleeve, and a lock-nut may also be used to draw the conical collar to its seat within a fitting or to pack the joint formed by the threaded end where the sleeve is long enough for the formation of an unthreaded ornamental portion in the middle, where a tongs may be applied to turn it.

The tubular connection may obviously be manufactured and sold for application to various fittings to take the place of the right and left nipples or the ground union-joints commonly made and sold for similar purposes, the purchaser making his fittings to match such tubular connections.

I hereby disclaim my application Serial No. 270,235, in which I have claimed, broadly, "a coupling for radiator-sections screwed to seats within the same and provided with a conical packing in one side of the joint" and a tubular connection "consisting in the sleeve having at one end a threaded portion and at the opposite end a divided conical collar fitted in a groove upon the sleeve."

Having thus set forth my invention, what I claim herein is—

1. As a new article of manufacture, the tubular connection consisting in the sleeve herein shown and described and having at one end a groove provided with a divided conical collar, a threaded portion adjacent to such groove, a lock-nut applied to such threaded portion and adapted to draw the conical collar to a suitable seat within a fitting, and a thread upon the opposite end of the sleeve to form connection with other fittings, as and for the purpose set forth.

2. As a new article of manufacture, the tubular connection consisting in the sleeve having at one end a groove provided with a divided conical collar and at the other end a threaded portion adapted to enter a threaded fitting and to adjust the collar to and from such fitting, and a lock-nut applied to such threaded portion, as and for the purpose set forth.

3. As a new article of manufacture, the tubular connection consisting in the sleeve having at one end a threaded portion sufficient to enter a tapped hole and to receive a lock-nut and at the opposite end a divided conical collar fitted in a groove upon the sleeve, a thread adjacent to such groove, and two lock-nuts applied to the threads and operating substantially as herein set forth.

4. The combination, with two radiator-sections having apertures formed, respectively, with a screw-thread and with a conical seat, of a sleeve having a screw-thread at the middle and one end, a divided conical collar fitted in a groove upon the sleeve at the other end, and jam-nuts applied to the middle threaded portion of the sleeve and operated to turn the sleeve in the threaded aperture and to draw the conical collar into the conical seat, as and for the purpose set forth.

In testimony whereof I have hereunto set my hand in the presence of two subscribing witnesses.

JOHN J. HOGAN.

Witnesses:
  C. E. CADY,
  THOS. S. CRANE.